Aug. 26, 1969
R. L. HENRY
3,463,896
ELECTRO-DISCHARGE MACHINING APPARATUS
Original Filed May 18, 1961
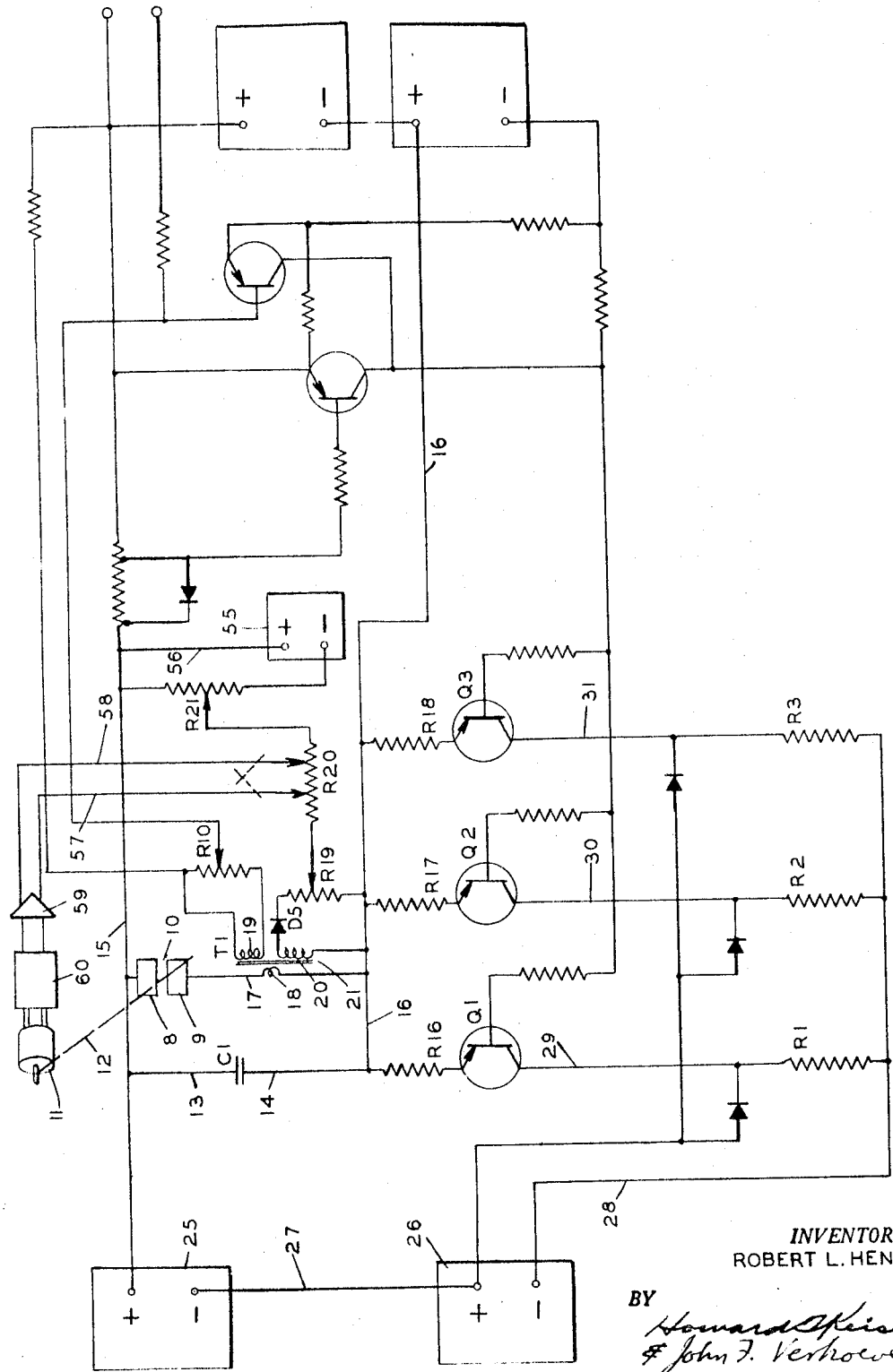
INVENTOR.
ROBERT L. HENRY
BY
Howard Keiser
& John F. Verhoeven
ATTORNEYS

United States Patent Office 3,463,896
Patented Aug. 26, 1969

3,463,896
ELECTRO-DISCHARGE MACHINING APPARATUS
Robert L. Henry, Cincinnati, Ohio, assignor to The Cincinnati Milling Machine Co., Cincinnati, Ohio, a corporation of Ohio
Original application May 18, 1961, Ser. No. 117,256, now Patent No. 3,286,127, dated Nov. 15, 1966. Divided and this application Aug. 15, 1966, Ser. No. 572,324
Int. Cl. B23k 9/16
U.S. Cl. 219—69     3 Claims

ABSTRACT OF THE DISCLOSURE

A servo-feed control for spark discharge machining apparatus having a gap current transformer for producing a voltage responsive to current pulses flowing through the gap which is then combined in series opposing relation with the voltage across the gap to produce a resultant voltage which is compared with a reference voltage to produce an error voltage that is representative of the difference between the actual gap spacing and the preselected gap spacing.

---

This application is a division of my copending patent application Ser. No. 117,256, filed May 18, 1961, for Electro-Discharge Machining Apparatus, now Patent No. 3,286,127, issued Nov. 15, 1966.

This invention relates to spark machining apparatus of the kind wherein a series of disruptive electric spark discharges are established between a tool electrode and a workpiece while the parts are immersed in a fluid dielectric such as oil, kerosene, etc. The sparks are produced by applying an electric potential across the gap between the tool and the workpiece which is of sufficient magnitude to ionize the dielectric fluid and cause a spark discharge to occur. Thereafter, the gap is permitted to deionize after which another spark is produced, and so on, so that a series of high-frequency sparks is established between the tool and the workpiece. Normally, a capacitor is connected between the tool and the workpiece, the capacitor being charged by the source of electrical energy connected across the gap and being discharged each time a spark spans the gap between the tool and the workpiece.

One of the objects of the present invention is to provide a spark discharge machining apparatus having a new and improved servo-feed control circuit which permits faster and smoother operation of the servo-feed mechanism that regulates the spacing between the tool and the workpiece.

With this and other objects in view, which will become apparent from the following description, the invention includes certain lovel features of construction and combinations of parts, the essential elements of which are set forth in the appended claims, and a preferred form or embodiment of which will hereinafter be described with reference to the drawing which accompanies and forms a part of this specification.

The single figure of the drawing is a schematic view of the improved electro-discharge machining control circuit.

The electro-discharge machining apparatus, to which the present invention applies, includes a machine structure (not shown) which serves to support a tool and a workpiece for relative movement toward and from one another to permit variation of the spacing therebetween. Reference may be had to the U.S. patent to Oezer, 2,807,706, or to the U.S. patent to Martellotti, 2,773,968, for a disclosure of this portion of the apparatus.

In the circuit shown in the figure, the tool and workpiece are represented by electrodes 8 and 9 which are separated by a gap 10. The width of the gap is controlled by a servo motor 11 which has a driving connection with either the tool or the workpiece to effect relative movement therebetween. This connection is represented on the drawing by the dashed line 12 and may constitute any suitable type of driving connection between the motor shaft and the machine slide.

CHARGING CIRCUIT

The circuit for impressing a potential difference across the gap 10, i.e., the charging circuit of the apparatus, is of the RC type in which a capacitor $C_1$ is charged through a series of parallel connected impedances including resistors $R_1$, $R_2$, and $R_3$, transistors $Q_1$, $Q_2$, and $Q_3$, and resistors $R_{16}$, $R_{17}$, and $R_{18}$. The capacitor $C_1$ is connected across the gap 10 by leads 13 and 14 which are connected to conductors 15 and 16, respectively. The electrode 8 is connected directly to conductor 15 while electrode 9 is connected to the conductor 16 by a wire 17 and the primary winding 18 of a transformer $T_1$. This transformer also has two secondary windings 19 and 20, the purpose of which will hereinafter be described. The transformer is preferably made in the form of a toroid with a ferrite core 21 on which the windings are wound in a known manner. The primary winding may be comprised of a few turns of wire wrapped around the core or, it may be formed by simply passing the wire 17 through the "window" of the core 21.

Charging current for the capacitor $C_1$ is obtained from a pair of direct-current power supplies 25 and 26 which are shown herein as separate units. It will be appreciated, however, that a single power supply with an intermediate voltage tap could be provided in lieu thereof. While the voltage supplied by the units 25 and 26 may be varied to suit the requirements of the particular application for which the equipment is designed, in the present instance the voltage delivered to the terminals of the supplies 25 and 26 is approximately 40 and 25 volts, respectively.

As indicated in the figure, the positive terminal of power supply 25 is connected to the conductor 15 while the negative terminal thereof is connected by a conductor 27 with the positive terminal of the supply 26. The negative terminal of this supply is connected by a conductor 28 with one end of each of the resistors $R_1$, $R_2$, and $R_3$. The opposite ends of the resistors $R_1$, $R_2$, and $R_3$, are connected by conductors 29, 30 and 31 to the collector electrodes of transistors $Q_1$, $Q_2$, and $Q_3$. The emitter electrodes of the transistors are connected by resistors $R_{16}$, $R_{17}$, and $R_{18}$ to the conductor 16 which connects with the lead 14 of capacitor $C_1$.

For the sake of discussion, it will be convenient to consider only one of the paths from conductor 28 to conductor 16 since the additional paths are provided simply for the purpose of increasing the current handling capability of the charging circuit. Thusly viewed, the potential provided by the supplies 25 and 26 is applied across the series combination of resistor $R_1$, transistor $Q_1$, resistor $R_{16}$, and capacitor $C_1$ so as to charge the capacitor. In this circuit, the resistor $R_{16}$, is a bias stabilization resistor and its resistance is considerably less than that of the main charging resistor $R_1$. The function of the latter resistor is to limit the current flow through the transistor when it is turned on with the capacitor $C_1$ discharged. In other words, this resistor is connected in series with the transistor $Q_1$ to prevent the entire voltage drop provided by the power supply from occurring across the transistor when it is turned on with the capacitor completely discharged. This is necessary in order to prevent the destruction of the transistor by the excessively high current which would flow therethrough if there were not resistance connected in the circuit to prevent it.

SERVO-FEED CONTROL

As heretofore noted, the transformer $T_1$ is provided with a secondary winding 20, one end of which is connected to the conductor 16 and the other end of which is connected through a diode $D_5$ to the upper end of a potentiometer $R_{19}$. The lower end of the potentiometer winding is connected to the conductor 16, and the slider thereof is connected through a potentiometer winding $R_{20}$ to a slider on a potentiometer $R_{21}$. One end of this potentiometer is connected to the conductor 15 while the other end thereof is connected to the negative terminal of a direct current power supply 55. The positive terminal of a power supply is connected by a conductor 56 to the conductor 15. The power supply 55 provides a source of reference voltage, a desired value of which may be selected by the slider of the potentiometer and delivered to one end of the winding of potentiometer $R_{20}$. It will be noted that changes in the current flowing through the primary winding of transformer $T_1$ will induce a voltage in the winding 20. The diode $D_5$ is poled so that the current flow resulting from this voltage can only traverse the potentiometer $R_{19}$ in a direction to render the upper end of the potentiometer positive with respect to the lower end thereof. Since the difference in potential between the conductor 15 and the conductor 16 is equal to the gap voltage, and since the potential developed across the potentiometer $R_{19}$ is arranged in a sense to reduce the voltage difference between conductor 15 and the slider of potentiometer $R_{19}$, the result is that the difference between the gap voltage and the current responsive voltage is applied to the left hand end of potentiometer $R_{20}$ and balanced against the reference voltage applied to the right hand end thereof. A desired portion of the resultant of these three voltages is selected by the ganged sliders of the sensitivity setting potentiometer $R_{20}$ and transmitted by conductors 57 and 58 to a servo amplifier 59. The resultant error signal is there amplified and delivered to a transducer 60 which may, for example, take the form of an electrohydraulic valve for operating the hydraulic motor 11 in accordance with the arrangement shown in U.S. Patent No. 2,807,706, granted Sept. 24, 1957, on an application filed by John J. Oezer.

From the foregoing it will be observed that since the current responsive signal obtained from the potentiometer $R_{19}$ is connected in series opposition with the gap voltage, therefore, for a given gap voltage, the slider of potentiometer $R_{21}$ can be net nearer the positive end of its winding than it could if the current responsive signal was not present. Therefore, when the tool is above the work, i.e., out of the cut, a higher voltage will be available to move the tool into the work. Also, when a short develops in the gap 10, the voltage across the gap will drop to zero, the current responsive signal from potentiometer $R_{19}$ will drop to zero, and the voltage from potentiometer $R_{21}$ delivered to the servo amplifier 59 will be less than it would be if potentiometer $R_{19}$ was not in the circuit. Hence, the servo-valve will not open as wide and retraction of the tool from the workpiece will be slower.

Also, since gap current increases as gap voltage decreases, and vice versa, changes in gap voltage are partially offset by changes in gap current as measured across potentiometer $R_{19}$, and changes in the resultant voltage appearing across potentiometer $R_{20}$ are accordingly smaller. Hence, the sensitivity may be "turned up," i.e., the setting of sensitivity potentiometer $R_{20}$ may be increased to select a larger portion of the voltage appearing thereon. This is advantages since it results in faster reaction of the servo-feed apparatus to tool-out-of-cut and shorted gap conditions when the voltage across potentiometer $R_{19}$ drops to zero. The amount of increase of sensitivity which is possible will depend on the setting of potentiometer $R_{19}$. That is, by increasing the amount of voltage inserted by this potentiometer, i.e., by increasing the amount of "differential" effect produced by the current responsive voltage, the amount by which the sensitivity may be increased will be augmented.

While in the foregoing description the invention has been described in connection with one possible form or embodiment thereof and certain specific terms and language have therefore been used herein, it is to be understood that the present disclosure is illustrative rather than restrictive and that changes and modifications may be resorted to without departing from the limits of the invention as defined by the claims which follow.

What is claimed is:

1. A spark discharging machining apparatus comprising a pair of electrodes separated by a spark gap, one of said electrodes comprising a tool and the other a workpiece, means to charge said electrodes to the ignition potential of the spark gap to cause sparking to occur, and a servo-feed control circuit for producing an error voltage whenever the distance separating said electrodes deviates from a preselected value, said circuit including a source of reference voltage, means to produce a first voltage which is responsive to intermittent current pulses flowing through the gap but not to steady state currents therein, means to combine said first voltage in series-opposing relation with the voltage across the spark gap to produce a resultant voltage which is primarily gap voltage responsive but is modified by the lower magnitude opposing voltage produced by the gap current pulses, and means to compare the resultant voltage with the reference voltage to produce an error voltage which is representative of the difference between the actual gap spacing and the preselected gap spacing and which produces a faster gap closing operation and a slower gap opening action upon short circuiting of the gap.

2. The spark discharge machining apparatus of claim 1 wherein said first voltage producing means includes a winding inductively coupled with the current flowing through the gap, and a rectifier connected with said winding for polarizing the direction of current flow therethrough.

3. The spark discharge machining apparatus of claim 2 including means for selecting a desired portion of the voltage produced by said first voltage producing means for combining with the voltage across the gap, and a sensitivity control element for selecting a predetermined portion of the error voltage for control purposes.

References Cited

UNITED STATES PATENTS

| | | | |
|---|---|---|---|
| 2,518,580 | 8/1950 | Trofimov | 314—69 |
| 2,804,493 | 8/1957 | Morey | 13—13 |
| 2,841,686 | 7/1958 | Williams. | |
| 2,901,588 | 8/1959 | McKechnie. | |

FOREIGN PATENTS 825,234  12/1959  Great Britain.

JOSEPH V. TRUHE, Primary Examiner

R. F. STAUBLEY, Assistant Examiner

U.S. Cl. X.R.

13—13; 314—65